(12) United States Patent
Fristad et al.

(10) Patent No.: US 7,332,021 B2
(45) Date of Patent: *Feb. 19, 2008

(54) COATING COMPOSITION

(75) Inventors: William E. Fristad, Rochester Hills, MI (US); Jeng-Li Liang, Auburn Hills, MI (US); David C. Montrose, Macomb, MI (US)

(73) Assignee: Henkel Kommanditgesellschaft auf Aktien, Düsseldorf (DE)

( * ) Notice: Subject to any disclaimer, the term of this patent is extended or adjusted under 35 U.S.C. 154(b) by 290 days.

This patent is subject to a terminal disclaimer.

(21) Appl. No.: 10/623,733

(22) Filed: Jul. 22, 2003

(65) Prior Publication Data

US 2005/0020746 A1 Jan. 27, 2005

Related U.S. Application Data

(63) Continuation-in-part of application No. 10/339,405, filed on Jan. 10, 2003, now Pat. No. 7,063,735.

(51) Int. Cl.
- C23C 22/06 (2006.01)
- C23C 22/48 (2006.01)
- C23C 22/84 (2006.01)
- C23F 11/00 (2006.01)
- C09D 5/08 (2006.01)

(52) U.S. Cl. ............... 106/14.11; 106/14.41; 106/14.43; 106/14.44; 148/244; 428/457; 428/469; 428/472; 428/472.1; 428/472.2

(58) Field of Classification Search ............ 106/14.11, 106/14.41, 14.43, 14.44; 148/244; 428/457, 428/469, 472, 472.1, 472.2

See application file for complete search history.

(56) References Cited

U.S. PATENT DOCUMENTS

| | | | |
|---|---|---|---|
| 3,749,649 A | 7/1973 | Valayil | |
| 3,912,548 A | 10/1975 | Falgen | |
| 4,148,670 A | 4/1979 | Kelly | |
| 4,273,592 A | 6/1981 | Kelly | |
| 5,061,575 A | 10/1991 | Mohri et al. | |
| 5,262,464 A | 11/1993 | Koevenig et al. | |
| 5,281,282 A | 1/1994 | Dolan et al. | |
| 5,356,490 A | 10/1994 | Dolan et al. | |
| 5,427,632 A * | 6/1995 | Dolan | 148/259 |
| 5,449,415 A * | 9/1995 | Dolan | 148/259 |
| 5,534,082 A | 7/1996 | Dollman et al. | |
| 5,571,447 A | 11/1996 | Ward et al. | |
| 5,639,586 A | 6/1997 | Hauquier et al. | |
| 5,641,542 A | 6/1997 | Melzer et al. | |
| 5,859,106 A | 1/1999 | Jones et al. | |
| 5,897,716 A * | 4/1999 | Reghi et al. | 148/247 |
| 5,905,105 A | 5/1999 | Jones et al. | |
| 5,938,861 A | 8/1999 | Inoue et al. | |
| 6,060,122 A | 5/2000 | Rossmaier | |
| 6,153,080 A | 11/2000 | Heimann et al. | |
| 6,168,868 B1 | 1/2001 | Hauser et al. | |
| 6,312,812 B1 | 11/2001 | Hauser et al. | |
| 6,361,602 B1 | 3/2002 | Hahn | |
| 6,372,043 B2 | 4/2002 | Tracy et al. | |
| 6,388,021 B1 | 5/2002 | Shibata et al. | |
| 6,464,800 B1 * | 10/2002 | Carlson et al. | 148/244 |
| 6,562,148 B1 | 5/2003 | Wendel et al. | |
| 6,764,553 B2 * | 7/2004 | Dolan | 148/243 |
| 2001/0050029 A1 | 12/2001 | Inbe et al. | |
| 2002/0053301 A1 | 5/2002 | Matzdorf et al. | |
| 2004/0025973 A1 | 2/2004 | Dolan et al. | |
| 2004/0163736 A1 | 8/2004 | Matsukawa et al. | |
| 2004/0170840 A1 | 9/2004 | Matsukawa et al. | |

FOREIGN PATENT DOCUMENTS

| | | |
|---|---|---|
| DE | 42 41 134 | 6/1994 |
| DE | 195 10 825 | 9/1996 |
| DE | 197 05 701 | 8/1998 |
| DE | 199 21 842 | 11/2000 |
| EP | 1063320 A1 | 12/2000 |
| EP | 1130131 A2 | 9/2001 |
| EP | 1 433 877 | 6/2004 |
| EP | 1 433 878 | 6/2004 |
| FR | 1155705 | 5/1958 |
| JP | 58-101427 | 12/1984 |
| WO | WO-00/26437 A1 | 5/2000 |
| WO | WO-00/39356 A1 | 7/2000 |
| WO | WO-00/68459 | 11/2000 |
| WO | WO-00/68466 | 11/2000 |
| WO | WO-02/10476 | 2/2002 |
| WO | WO-02/31063 A1 | 4/2002 |
| WO | WO-02/31222 A2 | 4/2002 |
| WO | WO-2006/071226 | 7/2006 |

OTHER PUBLICATIONS

Electronic Machine Translation of FR1155705 (May 7, 1958).*
Geeta Parashar et al., "Ethyl Silicate Binders for High Performance Coatings", Progress in Organic Coatings 42, 2001, pp. 1-14 (no month).
"Meaning of Alizarin", http://hyperdictionary.com/alizarin (no date).
Derwent Abstract No. 1998-019180, abstract of Chinese Patent Specification No. 1133903A (Oct. 1996).

* cited by examiner

*Primary Examiner*—Anthony J. Green
(74) *Attorney, Agent, or Firm*—Connolly Bove Lodge & Hutz LLP

(57) ABSTRACT

A coating composition comprising an aqueous mixture containing acid-stable particles and one or more fluoroacids. The amount of the acid-stable particles in the coating composition is from 0.005% to 8% by weight on a dry weight basis. The acid-stable particles can be selected from aluminum-modified silica particles, nonaluminum-modified silica particles, and organic particles selected from anionically stabilized polymer dispersion particles. The invention is also directed to a coating on a metal substrate. The coating contains acid-stable particles attached to the metal substrate through a metal-oxide matrix. The metal-oxide matrix comprises a metal selected from titanium, zirconium, silicon, hafnium, boron, aluminum, germanium, or tin.

32 Claims, 2 Drawing Sheets

COATING COMPOSITION

CROSS-REFERENCE TO RELATED APPLICATION

This application is a continuation-in-part of and claims benefit under 35 U.S.C. §120 of U.S. application Ser. No. 10/339,405, filed Jan. 10, 2003, which issued as U.S. Pat. No. 7,063,735.

FIELD OF THE INVENTION

The present invention relates to coating compositions, in particular, coating compositions that can be applied to metal substrates to enhance corrosion resistance. The invention also relates to coatings resulting from the coating compositions.

BACKGROUND OF THE INVENTION

A coating is often applied to metal substrates, especially metal substrates that contain iron such as steel, prior to the application of a protective or decorative coating. The coating minimizes the amount of corrosion to the metal substrate, if and when, the metal substrate is exposed to moisture and oxygen. Many of the present coating compositions are based on metal phosphates, and rely on a chrome-containing rinse. The metal phosphates and chrome rinse solutions produce waste streams that are detrimental to the environment. As a result, there is the ever-increasing cost associated with their disposal.

Coating compositions can be applied without chrome rinse solutions. For example, U.S. Pat. No. 3,966,502 discloses post-treating phosphated metals with zirconium-containing rinse solutions. However, this application process is only suitable for use over a limited number of metal substrates, and the generation of metal phosphate waste streams is not alleviated.

U.S. Pat. No. 5,534,082 to Dollman et al. and U.S. Pat. Nos. 5,281,282 and 5,356,490 to Dolan et al. describe non-chrome coating compositions containing a fluoroacid such as fluorotitanic acid, silica, and a water-soluble polymer such as an acrylic acid polymer and/or a polymer with hydroxyl functionality. By heating the silica and fluoroacid, the silica is dissolved, or at least partially dissolved, until the solution is clear. As a result, the silica particles used in these coating compositions are not acid-stable particles. The pH of these compositions is very acidic, and ranges from 0 to 4, preferably from 0 to 1. The coatings compositions enhance the corrosion resistance of steel and galvanized steel substrates.

U.S. Pat. No. 5,938,861 to Inoue et al. describes forming a coating on metal substrates, except aluminum. The coating composition includes an oxidative compound such as nitric acid or hydrogen peroxide, silicate or silicon dioxide particles, and a metal cation, oxymetal anion, or fluorometallate anion of Ti, Zr, Ce, Sr, V, W, and Mo.

EP 1130131A2 to Toshiaki et al. describes a non-chrome coating composition that contains a metallic surface-treating agent, water-dispersible silica, and one or more of a zirconium or titanium compound, thiocarbonyl compound, and a water-soluble acrylic resin. The metallic surface treating agent is selected from a provided list of silane coupling agents that are typically used in the coating industry to improve adhesion between the pre-coating and the decorative coating.

U.S. Pat. No. 5,859,106 to Jones et al. describes a non-chrome coating composition that contains a cross-linked polymer system, which includes a copolymer with acrylic and hydroxyl functionality or the reaction product of an acrylic polymer and a polymer with hydroxyl functionality. A fluoroacid such as fluorozirconic acid or fluorotitanic acid can be added to these compositions. U.S. Pat. No. 5,905,105 to Jones et al. describes a non-chrome coating composition that includes the coating composition described in U.S. Pat. No. 5,859,106 with the addition of dispersed silica and an ammonium carbonate containing a group IVB metal.

There is an interest to develop coating compositions and methods of applying such compositions without producing metal phosphate and chrome waste solutions. It is also preferred, that these coating compositions be effective in minimizing corrosion in a variety of metal substrates because many objects of commercial interest contain more than one type of metal substrate. For example, the automobile industry often relies on metal components that contain more than one type of metal substrate. The use of a coating composition effective for more than one metal substrate would provide a more streamlined manufacturing process.

SUMMARY OF THE INVENTION

The invention is directed to a coating composition and a process of making the coating composition. The coating composition comprises an aqueous mixture comprising acid-stable particles, and one or more fluoroacids. The invention is also directed to a process of making the coating compositions.

The invention is also directed to a coating on a metal substrate. The coating comprises acid-stable particles attached to the metal substrate through a metal-oxide matrix. The particles are acid-stable in the acidic, aqueous coating composition. The metal-oxide matrix comprises one or more metals selected from the group consisting of titanium, zirconium, silicon, hafnium, boron, aluminum, germanium, and tin. The coating coverage of the metal substrate is from 5 mg/sq ft to 50 mg/sq ft.

BRIEF DESCRIPTION OF THE DRAWING

The invention will be better understood by reference to the Detailed Description of the Invention when taken together with the attached drawing, wherein.

DETAILED DESCRIPTION OF THE INVENTION

Figure 1:
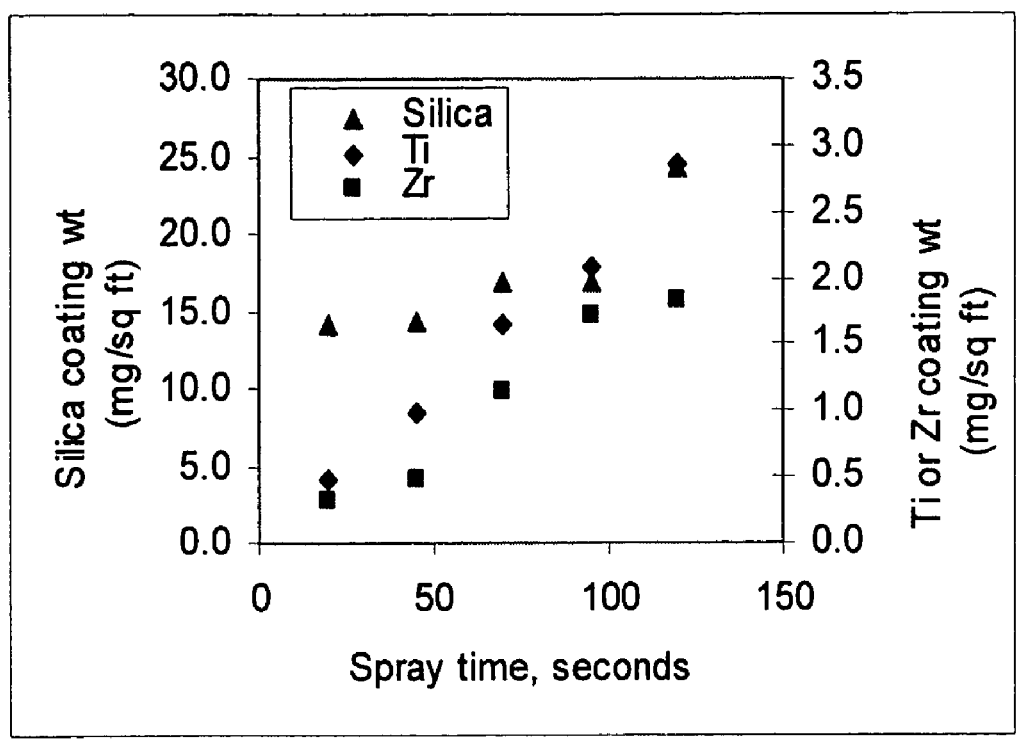
FIG. 1 is a plot of coating weights and compositions on CRS panels vs. spray time for coatings provided by a coating composition of the invention.

The coating composition comprises an aqueous mixture comprising acid-stable particles and one or more fluoroacids. The aqueous mixture can also contain a product of the acid-stable particles and the one or more fluoroacids. Particles are acid-stable if the change in viscosity as measured in a test sample, as described herein under the subheading, "Test procedure for acid-stable particles", is ten seconds or less, preferably five seconds or less. In most cases, test samples that correspond to the acid stable particles of the invention will have a change in viscosity of three seconds or less. In the most preferred embodiments, the acid-stable particles will have a change in viscosity of one second or less. Typically, the lower the change in viscosity the more stable the particles are in acid, that is, in an aqueous solution with a pH of 3 to 7.

The term "change in viscosity" used herein reflects the viscosity measurement made in accordance to the described test procedure. With respect to some of the compositions of the invention, their corresponding test samples can over 96 hours actually decrease in viscosity such that the measured change in viscosity is less than zero.

Alternatively, one of ordinary skill can determine if particles are acid-stable by preparing an acidified test sample containing the particles as described, and simply observing whether there is any visible indication of thickening, precipitation or gelling over about 96 hours at room temperature.

Typically, the acid-stable particles of the invention will maintain a negative charge at a pH from about 2 to about 7. In some cases, the acid-stable particles will maintain a negative charge at a pH from about 3 to about 6. In still other cases, the acid-stable particles will maintain a negative charge at a pH from about 3.5 to about 5.

One way to determine whether the acid-stable particles maintain a negative charge is by measuring the Zeta Potential of the particles. This measurement can be carried out using commercially available instruments such as a Zetasizer 3000HSA from Malvern Instruments Ltd. A negative measured voltage indicates the particles are negatively charged. Exemplary Zeta Potentials for silica-based, acid-stable particles used in the coating compositions are −5 to −35 mV. Exemplary Zeta Potentials for the organic, polymeric acid-stable particles used in the coating compositions are −55 to −85 mV.

The coating composition of the invention also contains water. Water is used to dilute the coating composition of the invention, and provides relatively long-term stability to the composition. For example, a composition that contains less than about 40% by weight water is more likely to polymerize or "gel" compared to a coating composition with about 60% or greater by weight water under identical storage conditions. Although the coating compositions of the invention typically applied to the substrate will contain about 92% water or greater, it is to be understood that a coating composition of the invention also includes a concentrated formulation composition with 60% to 92% by weight water. The end-user simply dilutes the concentrated formulation with additional water to obtain an optimal coating composition concentration for a particular coating application.

The coating composition of the invention can be provided as a ready-to-use coating composition, as a concentrated coating composition that is diluted with water prior to use, as a replenishing composition, or as a two component coating system. In a two-component coating system the fluoroacid is stored separately from the particles. The fluoroacid and the particles are then mixed prior to use by the end-user.

The concentration of each of the respective components of the coating compositions will, of course, be dependent upon whether the coating composition to be used is a replenishing coating composition, a concentrated coating composition, or a ready-to-use coating composition. A replenishing coating composition can be provided to and used by an end-user to restore an optimal concentration of components of a coating composition to a coating bath as the components are consumed during the coating of substrates. As a result, a replenishing coating composition will necessarily have a higher concentration of acid-stable particles or fluoroacids than the coating composition used to coat the substrate.

The concentration of acid-stable particles in the compositions of the invention depends on the type of particles used and the relative size, e.g., average diameter, of the particles. The coating compositions will contain from 0.005% to 8% by weight, 0.006% to 2% by weight, 0.007% to 0.5% by weight, or from 0.01% to 0.2% by weight, on a dry weight basis of acid-stable particles.

Acid-stable silica particles can be aluminum-modified silica particles. Aluminum-modified silica particles will have a weight ratio of $SiO_2:Al_2O_3$ from about from about 80:1 to about 240:1, and from about 120:1 to about 220:1. The concentration of aluminum-modified silica particles in the compositions of the invention is from 0.005% to 5% by weight, 0.006% to 1% by weight, 0.007% to 0.5% by weight, or from 0.01% to 0.2% by weight, on a dry weight basis of acid-stable particles.

In one embodiment, the acid-stable particles used in a coating composition are silica particles provided as a colloidal suspension from Grace Davison under the trademark Ludox® TMA, Ludox® AM, Ludox® SK, and Ludox® SK-G. These specific types of silica particles are treated with an aluminum compound, believed to be sodium aluminate. For example, Ludox® AM has a weight ratio of $SiO_2:Al_2O_3$ from about 140:1 to 180:1. Aluminum-modified silica such as Adelite® AT-20A obtained from Asahi Denka can also be used.

The acid-stable particles can be relatively spherical in shape with an average diameter from about 2 nm to about 80 nm, or from about 2 nm to about 40 nm, as measured by transmission electron microscopy (TEM). The particles can also be rod-shaped with an average length from about 40 nm to about 300 nm, and an average diameter from about 5 nm to about 20 nm. The particles can be provided as a colloidal dispersion, e.g., as a mono-dispersion in which the particles have a relatively narrow particle size distribution. Alternatively, the colloidal dispersion can be poly-dispersed in which the particles have a relatively broad particle size distribution.

The silica particles are typically in the form of discrete spheres suspended in an aqueous medium. The medium can also contain a polymer to improve stability of the colloidal suspension. The polymer can be one of the listed polymers provided below. For example, certain commercially available formulations include a polymer to maintain stability of the dispersion during storage. For example, Ludox® SK and Ludox® SK-G are two commercial forms of colloidal silica that contain a polyvinyl alcohol polymer.

It is to be understood, that the coating compositions do not require the presence of a polymer to maintain acid stability of the compositions at a pH from 2 to 7. However, in some applications, a polymer can be added to the coating compositions to provide even greater acid stability.

As indicated by the comparative coating compositions the use of Ludox® AS, Ludox® HS, and Ludox® TM silica particles do not provide acid-stable coating compositions, and thus are not acid-stable particles. That is not to say that these non acid-stable particles cannot be present in the coating compositions of the invention in relatively small amounts. It is to be understood, that the amount or concentration of non acid-stable particles that can be present in the coating compositions will depend upon the type of non acid-stable particles, the pH of the composition, the type of fluoroacid used, and the type and concentration of acid-stable particles in the composition. Of course, one of ordinary skill would also recognize that one or more different types of acid-stable silica particles can be combined in a coating composition of the invention.

In another embodiment, the acid-stable particles can be nonaluminum-modified silica particles. These silica particles are modified by some process, at times a proprietary process, that is not considered by those skilled in the art to be an aluminum modification process. The nonaluminum-modified silica particles are negatively charged and have a majority of silicon acid sites neutralized, for example, by sodium or ammonia. Examples of nonaluminum-modified silica particles that can be used in the coating compositions include colloidal particles from Nissan Chemical sold under the trademark Snowtex® O and Snowtex® N. The concentration of nonaluminum-modified silica particles in the compositions of the invention is from 0.005% to 5% by weight, 0.006% to 1% by weight, 0.007% to 0.5% by weight, or from 0.01% to 0.2% by weight, on a dry weight basis of acid-stable particles.

In another embodiment, a selection of organic, polymeric acid-stable particles can be used in the coating compositions. For example, polymeric particles selected from the group consisting of anionically stabilized polymer dispersions, such as epoxy-crosslinked particles, epoxy-acrylic hybrid particles, acrylic polymer particles, polyvinylidene chloride particles, and vinyl acrylic/vinylidine chloride/acrylic particles provide acid-stable coating compositions. Three commercially available polymeric particles that can be used include ACC 800 and ACC 901 from Henkel Corp., and Haloflex® 202 from Avecia, Inc. ACC 901 includes epoxy-crosslinked particles. ACC 800 includes polyvinylidene chloride particles. Haloflex® 202 includes vinyl acrylic/vinylidine chloride/acrylic particles. The concentration of organic polymeric particles in the compositions of the invention is from 0.01% to 8% by weight, from 0.01% to 5% by weight, and from 0.1% to 3% by weight, on a dry weight basis.

The fluoroacid is an acid fluoride or acid oxyfluoride with an element selected from the group consisting of Ti, Zr, Hf, Si, Sn, Al, Ge and B. The fluoroacid should be water-soluble or water-dispersible and preferably comprise at least 1 fluorine atom and at least one atom of an element selected from the group consisting of Ti, Zr, Hf, Si, Sn, Al, Ge or B. The fluoroacids are sometimes referred to by workers in the field as "fluorometallates".

The fluoroacids can be defined by the following general empirical formula (I):

$$H_pT_qF_rO_s \qquad (I)$$

wherein: each of q and r represents an integer from 1 to 10; each of p and s represents an integer from 0 to 10; T represents an element selected from the group consisting of Ti, Zr, Hf, Si, Sn, Al, Ge, and B. Preferred fluoroacids of empirical formula (I) include: T is selected from Ti, Zr, or Si; p is 1 or 2; q is 1; r is 2, 3, 4, 5, or 6; and s is 0, 1,or2.

One or more of the H atoms may be replaced by suitable cations such as ammonium, metal, alkaline earth metal or alkali metal cations (e.g., the fluoroacid can be in the form of a salt, provided such salt is water-soluble or water-dispersible). Examples of suitable fluoroacid salts include $(NH_4)_2SiF6$, $MgSiF_6$, $Na_2SiF_6$ and $Li_2SiF_6$.

The preferred fluoroacids used in the coating compositions of the invention are selected from the group consisting of fluorotitanic acid ($H_2TiF_6$), fluorozirconic acid ($H_2ZrF_6$), fluorosilicic acid ($H_2SiF_6$), fluoroboric acid ($HBF_4$), fluorostannic acid ($H_2SnF_6$), fluorogermanic acid ($H_2GeF_6$), fluorohafnic acid ($H_2HfF_6$), fluoroaluminic acid ($H_3AlF_6$), and salts of each thereof. The more preferred fluoroacids are fluorotitanic acid, fluorozirconic acid, fluorosilicic acid, and salts of each thereof. Some of the salts that can be used include alkali metal and ammonium salts, e.g., $Na_2MF_6$ and $(NH_4)_2\ MF_6$, where M is Ti, Zr, and Si.

The concentration of the one or more fluoroacids in the coating compositions of the invention can be relatively quite low. For example, a fluoroacid concentration of about 5 ppm can be used, and still provide corrosion resistant coatings (ppm=parts per million). The concentration of the one or more fluoroacids in the coating compositions is from about 5 ppm (about 0.0005% by weight) to about 10,000 ppm (about 1.0% by weight), from about 5 ppm to about 1000 ppm and from 5 ppm to about 400 ppm. The preferred concentrations of the one or more fluoroacids in the coating compositions is from about 3 ppm to about 3000 ppm, more preferably from about 10 ppm to about 400 ppm. The final concentration, of course, will depend upon the amount of water used to prepare the coating compositions of the invention.

The addition of catechol compounds in the coating compositions can be used to provide a visible color indicator that the metal substrate is indeed coated. Without the catechol compound, the resulting coatings can be, at times, too thin to be visible. The term "catechol compound" is defined as an organic compound with an aromatic ring system that includes at least two hydroxyl groups positioned on adjacent carbon atoms of the aromatic ring system.

The preferred catechol compounds used to prepare the coating compositions of the invention are negatively charged or neutral, that is, have no charge. The negatively charged catechol compounds are commonly available as metal salts, particularly as alkali or alkaline earth metal salts.

The concentration of catechol compound in the coating compositions of the invention can be optimized by those skilled in the art to provide a visible coating. The concentration of the catechol compound will depend on the type of catechol compound used. Also, each catechol compound can be expected to have a different interaction with each type of acid-stable particles used in the coating composition. As a result, the optimal concentration of catechol compound depends upon which type(s) of acid-stable particles are used in the coating compositions. Lastly, because any excess catechol compound can be removed with a rinse step following application of the coating composition to a metal substrate, the concentration of the catechol compound can be greater than what is required to provide a visibly colored coating.

In one embodiment, the catechol compound is selected from the alizarin series of compounds. For example, alizarin, alizarin red, alizarin orange, and the salts of each thereof can be used to prepare the coating compositions of the invention. One preferred alizarin compound is alizarin red, i.e., 3,4-dihydroxy-9,10-dioxo-2-anthracenesulfonic acid or the salt thereof.

In another embodiment, the catechol compound is selected from pyrocatechol, and conjugated pyrocatechols. The term "conjugated pyrocatechol" is defined as pyrocatechol with a conjugated ring system. Pyrocatechol sulfonephthalein, i.e., pyrocatechol violet, or the salts thereof, is one preferred conjugated pyrocatechol.

The coating compositions of the invention can also include one or more polymers. The one or more polymers preferably comprise functional groups selected from hydroxyl, carboxyl, ester, amide, or combinations thereof. The functional groups on the polymers are believed to serve various functions. First, prior to forming the coatings, the functional groups provide a polymer that has a relatively high solubility or miscibility in water. Second, the functional groups provide points along the polymer backbone through which cross-linking between the polymers can occur as the coating composition cures to form a coating on a metal substrate. Third, the functional groups on the polymer are believed to enhance binding between the metal substrate and particles in the cured coating.

An exemplary list of the one or more polymers used are selected from polyvinyl alcohol, polyester, water-soluble polyester derivatives, polyvinylpyrrolidone, polyvinylpyrrolidone-vinylcaprolactam copolymer, polyvinylpyrrolidone-vinylimidazole copolymer, and sulfonated polystyrene-maleic anhydride copolymer. The most preferred polymers used include polyvinyl alcohol, polyvinylpyrrolidone-vinylcaprolactam copolymer. Luvitec® and Elvanol® are two commercially available types of polymers that can be used to prepare a coating composition of the invention. Luvitec® is a vinylpyrrolidone-vinylcaprolactam polymer available from BASF. Elvanol® is a polyvinyl alcohol polymer available from Dupont.

In the presence of one or more of the above polymers, the fluoroacids can function as a curing agent as well as a binding agent. It is believed that the fluoroacid reacts with the functional groups of the polymer, and thus can provide a means for the polymer to cross-link. The cross-linking of the polymer in combination with the fluoroacid provides a cement-like polymer-metal oxide matrix that binds the particles to form a coating on a metal substrate.

A coating composition of the invention is prepared by a process comprising: providing acid-stable particles and one or more fluoroacids; and mixing the acid-stable particles and the one or more fluoroacids in water. The amount of acid-stable particles in the coating composition is from 0.005 to 8% by weight on a dry weight basis. Preparation of the coating composition can also include one or more polymers exemplified in the list above, and mixing the polymer with the other components.

The pH of a coating composition of the invention ranges from about 2 to about 7, preferably from about 3 to about 6, and more preferably from about 3.5 to about 5. The pH of the coating composition can be adjusted using mineral acids such as hydrofluoric acid, phosphoric acid, and the like, including mixtures thereof. Alternatively, additional amounts of the fluoroacids can be used. Organic acids such as lactic acid, acetic acid, citric acid, sulfamic acid, or mixtures thereof can also be used.

The pH of the coating composition can also be adjusted by adding small amounts of an alkali material, typically in the form of a metal or ammonium hydroxide, carbonate, or bicarbonate. Exemplary inorganic and organic bases include sodium hydroxide, ammonium hydroxide, ammonia, or amines, e.g., triethanolamine or other alkylamines.

The coating compositions can also include one or more secondary agents selected from a leveling agent, a wetting agent, an antifoaming agent, and a bonding agent. However, one of ordinary skill would understand that the use of such agents, and the concentrations at which they are used, must be compatible within the pH range of the coating composition. The addition of too much of a secondary agent could significantly diminish the acid stability of the compositions.

The coating composition of the invention can be applied to a metal substrate to form a corrosion resistant coating. Metal substrates that can be passivated (provided with enhanced corrosion resistance) by the coating compositions of the invention include cold rolled steel, hot-rolled steel, stainless steel, steel coated with zinc metal, zinc alloys such as electrogalvanized steel, galvalume, galvanneal, and hot-dipped galvanized steel, aluminum alloys and aluminum plated steel substrates. The invention also offers the advantage that components containing more than one type of metal substrate can be passivated in a single process because of the broad range of metal substrates that can be passivated by the coating compositions of the invention.

Although not necessary, the metal substrate is usually cleaned to remove grease, dirt, or other extraneous materials by using conventional cleaning procedures and materials, e.g., mild or strong alkaline cleaners. Examples of alkaline cleaners include Parco® Cleaner ZX-1 and Parco® Cleaner 315, both of which are available from Henkel Surface Technologies. The metal substrate is then rinsed with water or an aqueous acidic solution. The metal substrate can also be treated with a commercially available metal phosphate solution, e.g., iron or zinc phosphate solutions, prior to contacting the metal substrate with a coating composition of the invention.

A coating composition of the invention is applied to the metal substrates in any number of ways known in the art. Two of the most preferred methods are spraying and immersion. The thickness and composition of the cured coating on the metal substrate depends on a number of factors including particle size, particle concentration, and exposure time or time in contact with the coating composition.

FIG. 1 is provided to show how the composition of a dried coating on a CRS panel prepared from the coating composition of Example 1 can change with spray time. As shown, the concentration of silica (weight of silicon and oxygen) in the coating is relatively independent of spray time, that is, the amount of silica is relatively constant at about 14 to 17 mg/sq ft over a spray time of about 25 to 100 seconds. This would be expected given the proposed monolayer structure of the coating.

Figure 2:
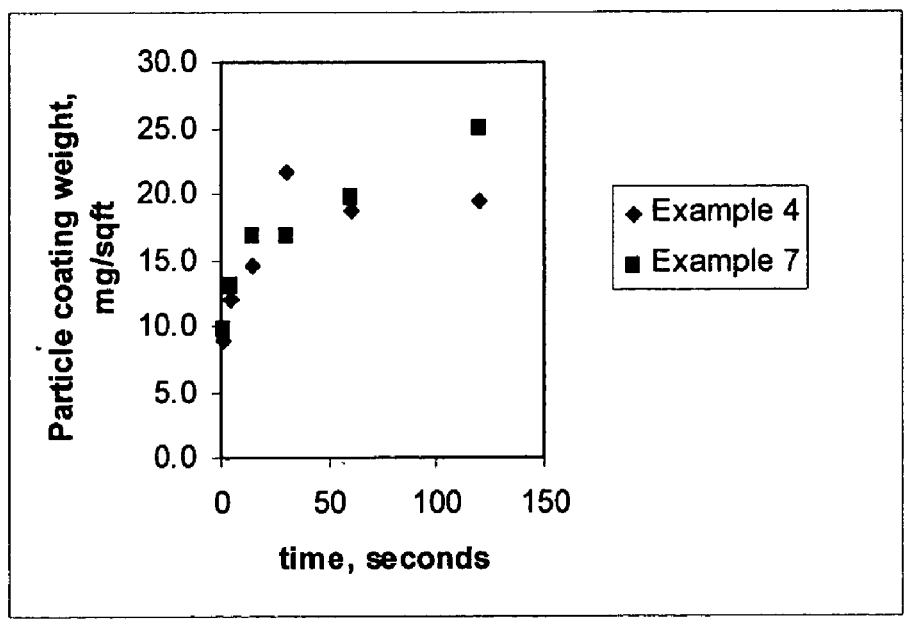
FIG. 2 is a plot of coating weights on CRS panels vs. spray time for coatings provided by other coating compositions of the invention.
Figure 3:
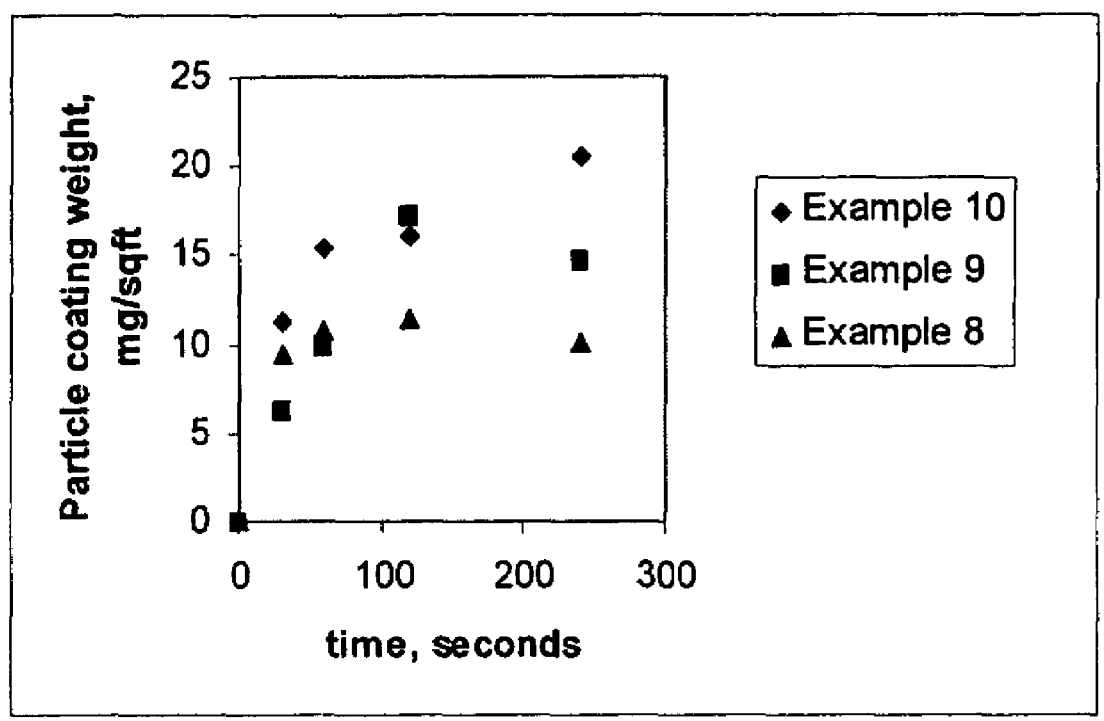
FIG. 3 is yet another a plot of coating weights on CRS panels vs. spray time for coatings provided by still other coating compositions of the invention.

FIGS. 2 and 3 depict differences in the thickness coatings over a spray time of about 25 to 125 seconds for selected coating compositions of the invention.

In contrast, the amount of titanium and zirconium in the coating is shown to increase linearly with time. The amount of metal in the coating is from 0.5 mg/sq ft to 6 mg/sq ft. In many instances, the amount of metal in the coatings is from 0.5 mg/sq ft to 3 mg/sq ft.

The coatings resulting from the compositions of the invention are relatively low weight coatings when compared to present coating technologies. The coatings of the invention have a coating weight from 5 mg/sq ft to 50 mg/sq ft. In many instances, however, the coatings will have a coating weight from 8 mg/sq ft to 30 mg/sq ft. In fact, coatings with a coating weight from 8 mg/sq ft to 20 mg/sq ft are typically formed from the coating compositions.

Following treatment of a metal substrate with a coating composition, the coating composition can be dried in place on the surface of the metal substrate. Alternatively, the applied coating composition can be rinsed, preferably with water, to remove excess coating composition, and then dried. The drying can be done at any temperature. Typical convenient temperatures are from 100° F. to 300° F. The drying conditions selected depend upon the customer's preferences, space available, and the type of finish coating used. For example, a powder coating typically requires a dry surface prior to application compared to a water-based coating.

The coating comprises acid-stable particles attached to the metal substrate through a metal-oxide matrix. In the context of a cured coating on a metal substrate, the use of the term "acid-stable" particle to describe the particle in the coating refers to particles that provide acid-stable coating compositions defined herein. The metal-oxide matrix comprises one or more metals selected from the group consisting of titanium, zirconium, silicon, hafnium, boron, aluminum, germanium, and tin. The metal-oxide matrix preferably comprises one or more metals selected from titanium, zirconium, and silicon. If a water soluble polymer is present in the coating composition, the metal-oxide matrix can further contain a reaction product of the one or more polymers and the one or more fluoroacids or salts of each thereof. The coating of the invention can be described as a brick and mortar coating with the particles represented by the bricks and the metal oxide matrix represented by the mortar.

One advantage of the coatings of the invention is that they provide comparable and, in most instances, improved corrosion resistance relative to present iron phosphate coating technology. Also, this improvement in corrosion resistance is achieved with a coating coverage that is significantly less than present iron phosphate coatings. For example, to provide an acceptable degree of corrosion resistance to a CRS panel, iron phosphate coatings are applied at a coverage level from about 50 mg/sq ft to 150 mg/sq ft. In contrast, a coating of the invention can provide a similar degree of corrosion resistance at a coverage level from 8 mg/sq ft to 30 mg/sq ft. In most cases, a coating of the invention exhibits an acceptable degree of corrosion resistance at coverage levels from 8 mg/sq ft to 20 mg/sq ft.

Another advantage of the coatings of the invention over iron phosphate coatings is exhibited through its relatively high flexibility and durability. In impact tests and bending tests the coatings of the invention typically maintain their corrosion resistance while the iron phosphate coatings do not. Moreover, these tests were performed with coatings of the invention at coverage levels of less than 20 mg/sq ft, while the iron phosphate coatings had coverage levels of about 65 mg/sq ft.

Additional coatings can then be applied. In most cases, these coatings can be a primer paint composition or a final paint coating such as a finish coat. One of the many advantages of the coatings of the invention is that the coatings are compatible with any number of protective paints such as Duracron® 200, which is a high solid, acrylic paint from PPG Industries, and powder paints such as Sunburst® Yellow, which is a polyester powder paint from Morton International. The coatings of the invention are also compatible with paints that are applied by electrodeposition.

The invention and its benefits will be better understood with reference to the following examples. These examples are intended to illustrate specific embodiments within the overall scope of the invention as claimed, and are not to be understood as limiting the invention in any way.

1. Test Procedure for Acid-Stable Particles.

Prepare a sodium acetate/acetic acid buffer with a pH of about 5.0 by acidifying the solution with hydrochloric acid. To 20 mL of buffer solution add 20 mL of the selected particle dispersion. As a test sample, the particle dispersion should have a silica concentration of about 30 wt %. If the selected particle dispersion has a higher wt %, dilute the dispersion to 30 wt %. Stir the solution for ten minutes. Observe whether the solution remains fluid, that is, whether there is any visible indication of thickening, precipitation or gelling over about 96 hours at room temperature. An experimental method used to qualitatively define acid-stable particles is to measure the change in viscosity of a test sample above after 84 hours at room temperature. Applicants measure the change in viscosity using a Zahn Cup apparatus from Gardner Laboratory Division, Pacific Scientific Co.

The Zahn viscosity cup is a small U-shaped cup suspended from a wire. The cup has an orifice, which is available in various sizes, at its base. For example, the #2 Zahn cup used in the acid stability test is certified to ASTM D4212 with an orifice diameter of 2.69 mm. The viscosity of a sample is measured by completely submerging the cup into the test sample. The cup is then completely withdrawn from the sample. The time in seconds from the moment the top of the cup emerges from the sample until a portion of the stream breaks free from the stream falling through the orifice is the measure of the viscosity of the sample.

Following the acid-stability procedure described above, a sodium acetate/acetic acid buffer with a pH of about 5.0 was prepared. 20 mL of the selected particle dispersion was added to 20 mL of the buffer solution. The particle dispersion should have a silica concentration of about 30 wt %. If the selected particle dispersion has a higher wt %, dilute the dispersion to 30 wt %. Stir the solution for ten minutes. The fresh viscosity measurement was made at about this time.

Each sample is then allowed to sit at about room temperature until the next viscosity measurement is made. As shown in Table 1, there was little, if any, change in viscosity for test samples prepared from the particles of Examples 1-10 at 96 hours. In comparison, Comparative Examples 1-4 are observed to thicken or gel over 96 hours. Because these samples had gelled at 96 hours, the final viscosity measurement was made after 84 hours, Table 2.

2. Preparation of the Metal Substrates.

Panels of cold-rolled steel and electrogalvanized steel used to test the corrosion resistance of the cured coatings are pretreated as follows. The panels are treated with Parco Cleaner 1523, which is an alkaline cleaner available from Henkel Surface Technologies. The panels are sprayed with the cleaner (about 2% in water) at 120° F. for 2 minutes. The cleaned panels are rinsed with a warm tap water spray for 30 seconds. A coating composition of the invention is sprayed on the rinsed panels for 30 seconds at ambient temperature. Alternatively, the panels are immersed in the coating compositions. The coated panels are then optionally rinsed with a cold water spray rinse for 30 seconds. Typically, if a relatively high particle content coating composition of the invention is used a water rinse will follow to remove residual (unbound) particles from the panels. The water rinse is not usually necessary for relatively low particle content coating compositions. The panels are then dried at 300° F. for 5 minutes. Coating weight of this invention was obtained by measuring the metal content, e.g., silicon, titanium, and zirconium, using x-ray fluorescence of the coated panels. Silica coating weight can also be measured by the weigh-coat-weigh-strip-weigh procedure, where the invention is stripped by 45% potassium hydroxide at 170° F.

TABLE 1

| Ex. | Acid stable particle | viscosity (fresh) sec. | viscosity (96 hrs) sec. | Δ, change in viscosity |
|---|---|---|---|---|
| 1 | Ludox TMA | 14 | 15 | 1 |
| 2 | Ludox AM | 14 | 14 | 0 |
| 3 | Ludox SK | 14 | 14 | 0 |
| 4 | Ludox SK-G | 14 | 14 | 0 |
| 5 | Snowtex C | 14 | 15 | 1 |
| 6 | Snowtex O | 14 | 14 | 0 |
| 7 | Snowtex N | 14 | 15 | 1 |

TABLE 1-continued

| Ex. | Acid stable particle | viscosity (fresh) sec. | viscosity (96 hrs) sec. | Δ, change in viscosity |
|---|---|---|---|---|
| 8 | ACC 800 | 14 | 14 | 0 |
| 9 | Haloflex 202 | 15 | 15 | 0 |
| 10 | ACC 901 | 15 | 15 | 0 |

TABLE 2

| Comp. Ex. | Non-acid stable particle | viscosity (fresh) sec. | viscosity (84 hrs) sec. | Δ, change in viscosity | after 96 hr |
|---|---|---|---|---|---|
| 1 | Cabospere A-205 | 14 | 30 | 16 | gel |
| 2 | Luodx AS-30 | 15 | 96 | 81 | gel |
| 3 | Snowtex 40 | 14 | 112 | 98 | gel |
| 4 | Snowtex OUP | 14 | 65 | 51 | gel |

3. Application of Finish Coat on Coated Substrates.

The coated and dried panels are painted with Duracron 200, a polyacrylic enamel coating commercially available from PPG Industries, Inc., or Sunburst Yellow, an epoxy-polyester hybrid powder paint commercially available from Morton International. The painted panels are allowed to cure according to recommendations by the manufacturer.

4. Corrosion Tests.

To test the corrosion resistance of the panels, the panels are scribed and a salt solution (5% NaCl) is sprayed on the scribed panels for either 500 hr or 750 hr (ASTM B-117 method). The corrosion resistance of the coated panels is evaluated by measuring the creepage from the scribe. The data reported in Table 3 is the distance in mm of the widened scribe following corrosion by the spray solution on CRS panels. As a result, the smaller the number, the more effective the corrosion resistance of the coating.

EXAMPLE 1

Fluorotitanic acid (0.4 g, 60%) and fluorozirconic acid (0.4 g, 20%) are added to stirred distilled water (3989.2 g). As this mixture is stirred, 10 g of Ludox® TMA (33% silica) is added. The pH of this mixture is adjusted to about 4 by adding ammonium carbonate and/or small amounts of additional fluorotitanic acid. The mixture is stirred for about two hours.

EXAMPLES 2 to 10

Examples 2 to 10 are coating compositions prepared according to the procedure of Example 1 with the exception of the type and the concentration of acid-stable particle used. The type and weight percent of particles for Examples 1 to 10 is provided in Table 4. The weight percent of fluorotitanic acid and fluorozirconic acid in Examples 2 to 10 is about 0.01%.

TABLE 3

| Coating | Scribe creep (mm)[a] | Scribe creep (mm)[b] | Coating weight mg/sq ft |
|---|---|---|---|
| Bonderite 1090 with PLN 99A seal | 4.2 | 4.2 | 60 |
| Example 1 | 3.6 | 4.2 | 15 |
| Example 10 | 2.2 | 2.9 | 16 |

[a]500 hour salt spray, paint is Duracron 200.
[b]750 hour salt spray, paint is Sunburst Yellow.

Bonderite B-1090 and PLN 99A are iron phosphate and polymer rinse from Henkel Corp.

TABLE 4

| Ex. | Particle type and wt % | Pass Acid Stability Test | Coating thickness[a] (nm) | Particle size[b] (nm) | Surface modified | Coating weight mg/sq ft |
|---|---|---|---|---|---|---|
| 1 | 0.25% Ludox® TMA | Yes | 73 | 60 | aluminum | 15 |
| 2 | 0.25% Ludox® AM | Yes | 44 | 35 | aluminum | 9 |
| 3 | 0.25% Ludox® SK | Yes | 44 | 35 | aluminum | 9 |
| 4 | 0.25% Ludox® SK-G | Yes | 97 | 30 | aluminum | 20 |
| 5 | 1% Snowtex® C | Yes | 44 | 31 | aluminum | 9 |
| 6 | 1% Snowtex® O | Yes | 55 | 33 | Proprietary | 10.5 |
| 7 | 1% Snowtex® N | Yes | 97 | 35 | Proprietary | 20 |
| 8 | 0.5% ACC 800 | Yes | 103 | 95 | n/a | 11.5 |
| 9 | 0.5% Haloflex 202 | Yes | 155 | 201 | n/a | 17.3 |
| 10 | 2% ACC 901 | Yes | 143 | 177 | n/a | 16 |

[a]A density of 2.2 for silica particle and 1.2 for organic polymeric particles was used with the measured coating weight to obtain film thickness values. Silica particles are stripped with 45% KOH at 170° F. Polymeric particles were dried at 120° F. and then acetone stripped. For Example #1, the coating thickness was estimated from the following calculation with silica coating weight of 15 mg/sqft and density of 2.2 g/cubic centimeter:

$$15 \frac{mg}{sqft} \cdot \frac{g}{1000 \ mg} \cdot \frac{sqft}{0.093 \ sqmeter} \cdot \frac{sqmeter}{10000 \ sqcentimeter} \div 2.2 \frac{g}{cubic.centimeter} \approx$$

$$73 \times 10^{-7} \ centimeter = 73 \ nm$$

EXAMPLES 11 to 16

Examples 11 to 16 are coating compositions prepared according to the procedure of Example 1 with the exception of the concentration of acid-stable particle, titanium and zirconium used. The weight percents of particles, titanium, and zirconium for Examples 11 to 16 are provided in Table 5. The titanium and zirconium were provided in the form of fluorotitanic and fluorozirconic acid. The titanium, zirconium and silica contents were measured by inductively coupled plasma (ICP) spectroscopy.

EXAMPLES 17 to 20

Examples 17 to 20 are coating compositions prepared according to the procedure of Example 1 with the exception of the concentration of acid-stable particle used, and the concentration of zirconium. The weight percents of particles and zirconium for Examples 17 to 20 are provided in Table 6.

TABLE 5

| | | | | Scribe creep (mm) | | | |
|---|---|---|---|---|---|---|---|
| Example | silica % | Ti % | Zr % | CRS/Duracron 200, 500 hr NSS | EG/Duracron 200, 20 cycles GM9540P | CRS/Sunburst Yellow, 750 hrs NSS | Coating weight mg/sq ft |
| B-1090/ PLN99A | N/A | N/A | N/A | 4.5 | 1.8 | 6 | 60 |
| 11 | 0.435 | 0.0144 | 0.0093 | 3.8 | 0.4 | 5.2 | 29.8 |
| 12 | 0.434 | 0.0098 | 0.0093 | 3.6 | 0.6 | 5.0 | 32 |
| 13 | 0.426 | 0.0088 | 0.009 | 4 | 0.8 | 5.8 | 26.6 |
| 14 | 0.439 | 0.0084 | 0.0088 | 3.9 | 0.6 | 5.6 | 20.6 |
| 15 | 0.425 | 0.0084 | 0.0088 | 4.4 | 0 | 5.0 | 17.1 |
| 16 | 0.409 | 0.0073 | 0.0084 | 4.2 | 0.2 | 5.8 | 16.7 |

COMPARATIVE EXAMPLES 1 to 6

Comparative Examples 1 to 3 are coating compositions containing Ludox®-type silica particles. Comparative Examples 4 and 5 are coating compositions containing Snowtex®-type silica particles. Comparative Example 6 is a coating composition containing Cabosperse® A-205 silica particles.

Comparative Examples 1 to 6 are prepared according to the procedure of Example 1 with the exception of the type of silica particles used. The weight percent of fluorotitanic acid and fluorozirconic acid is about 0.01%. Comparative Examples 1 to 6 do not contain acid-stable particles, and attempts to use these compositions failed to provide any coating to the panels. Comparative Examples 1 to 6 are summarized with the corresponding coating data in Table 7.

TABLE 7

| Comparative Ex. No. | Particle type and wt % | Pass acid stability test | Surface modified | Particle size (nm) |
|---|---|---|---|---|
| 1 | 0.25% Ludox® AS-30 | No | no | 12 |
| 2 | 0.25% Ludox® HS | No | no | 12 |
| 3 | 0.25% Ludox® TM | No | no | 20 |
| 4 | Snowtex 40 | No | no | 15 |
| 5 | Snowtex 50 | No | no | 25 |
| 6 | Cabosperse A-205 | No | no | 150 |

We claim:
1. A coating composition comprising an aqueous mixture comprising
    acid-stable particles and one or more fluoroacids, wherein the amount of the acid-stable particles in the coating composition is from 0.005% to 8% by weight on a dry weight basis.

TABLE 6

| | | | | Scribe creep (mm) | | | |
|---|---|---|---|---|---|---|---|
| Example | Silica % | Zr % | CRS/Duracron 200, 500 hr NSS | CRS/Duracron 200, 20 cycles GM9540P | CRS/Sunburst Yellow, 750 hrs NSS | CRS/Sunburst Yellow, 40 cycles GP9540P | Coating weight, mg/sq ft |
| B-1090/ PLN99A | N/A | N/A | 3.9 | 3.2 | 7.6 | 7 | 57 |
| 17 | 0.0059 | 0.004 | 4.2 | 2.8 | 7.1 | 7.1 | 28.4 |
| 18 | 0.013 | 0.008 | 3.2 | 2.6 | 6.9 | 6.9 | 24.3 |
| 19 | 0.013 | 0.009 | 3.4 | 2.7 | 7.3 | 7.3 | 33.3 |
| 20 | 0.016 | 0.011 | 3.2 | 2.7 | 6.7 | 6.7 | 27.1 |

2. The coating composition of claim 1 wherein the acid-stable particles are aluminum-modified silica particles, and the amount of the acid-stable particles in the coating composition is from 0.005% to 5% by weight on a dry weight basis.

3. The coating composition of claim 1 wherein the acid-stable particles are nonaluminum-modified silica particles, and the amount of the acid-stable particles in the coating composition is from 0.005% to 5% by weight on a dry weight basis.

4. The coating composition of claim 1 wherein the acid-stable particles are polymeric organic particles.

5. The coating composition of claim 1 wherein the mixture further comprises a product of the acid-stable particles and the one or more fluoroacids.

6. The coating composition of claim 2 wherein the aluminum-modified silica particles comprise about 0.006% to about 1% by weight on a dry weight basis of the composition.

7. The coating composition of claim 2 wherein the aluminum-modified silica particles have a $SiO_2$:$Al_2O_3$ weight ratio from 80:1 to 240:1.

8. The coating composition of claim 2 wherein the aluminum-modified silica particles have a $SiO_2$:$Al_2O_3$ weight ratio from 120:1 to 220:1.

9. The coating composition of claim 3 wherein the non-alunimun-modified silica particles comprise about 0.006% to about 1% by weight on a dry weight basis of the composition.

10. The coating composition of claim 1 wherein the acid-stable particles maintain a change in viscosity often seconds or less.

11. The coating composition of claim 1 wherein the composition has a pH from 3 to 6.

12. The coating composition of claim 1 wherein the composition has a pH from 3.5 to 5.

13. The coating composition of claim 1 wherein the acid-stable particles maintain a change in viscosity of three seconds or less.

14. The coating composition of claim 3. wherein the amount of the acid-stable particles in the coating composition is from 0.006% to 2% by weight on a dry weight basis.

15. The coating composition of claim 1 wherein the amount of the acid-stable particles in the coating composition is from 0.007% to 0.5% by weight on a dry weight basis.

16. The coating composition of claim 1 wherein the concentration of the one or more fluoroacids in the coating compositions is from about 5 ppm to about 1000 ppm.

17. The coating composition of claim 1 wherein the acid-stable particles maintain a change in viscosity of one second or less.

18. A coating composition prepared by a process comprising: providing acid-stable particles and one or more fluoroacids; and mixing the acid-stable particles and the one or more fluoroacids in water, wherein the coating composition has a pH from 2 to 7, and the amount of the acid-stable particles in the coating composition is from 0.005 to 8% by weight on a dry weight basis.

19. The coating composition of claim 18 wherein the acid-stable particles are selected from one or more of the group consisting of aluminum-modified silica particles, non-aluminum-modified silica particles, and organic polymeric particles.

20. The coating composition of claim 19 wherein the aluminum-modified silica particles comprise about 0.006 to about 1% by weight on a dry weight basis of the composition.

21. The coating composition of claim 19 wherein the nonaluminum-modified acid stable silica particles comprise about 0.006% to about 1% by weight on a dry weight basis of the composition.

22. The coating composition of claim 19 wherein the organic polymeric particles comprise about 0.01% to about 5% on a dry weight basis by weight of the composition.

23. The coating composition of claim 18 wherein the composition has a pH from 3 to 6.

24. The coating composition of claim 18 wherein the composition has a pH from 3.5 to 5.

25. The coating composition of claim 18 wherein the amount of the acid-stable particles in the coating composition is from about 0.006% to about 2% by weight on a dry weight basis.

26. The coating composition of claim 18 wherein the amount of the one or more fluoroacids in the coating compositions is from about 5 ppm to about 1000 ppm.

27. The coating composition of claim 18 wherein the acid-stable particles maintain a change in viscosity of three seconds or less.

28. A coating composition consisting essentially of 0.006% to 2% by weight, on a dry weight basis, of acid-stable particles and one or more fluoroacids having a pH from about 3 to 6, wherein the coating composition in a cured state provides a coating coverage on a metal substrate from 8 mg/sq ft to 30 mg/sq ft.

29. The coating composition of claim 28 wherein the acid-stable particles are selected from the group consisting of aluminum-modified silica particles, nonaluminum-modified acid stable silica particles, and organic polymeric particles.

30. The coating composition of claim 28 wherein the amount of the acid-stable particles in the coating composition is from about 0.007% to about 0.5% by weight on a dry weight basis.

31. The coating composition of claim 28 wherein the amount of the one or more fluoroacids in the coating compositions is from about 5 ppm to about 1000 ppm.

32. The coating composition of claim 28 wherein the acid-stable particles maintain a change in viscosity of three seconds or less.

* * * * *

UNITED STATES PATENT AND TRADEMARK OFFICE
CERTIFICATE OF CORRECTION

| | |
|---|---|
| PATENT NO. | : 7,332,021 B2 |
| APPLICATION NO. | : 10/623733 |
| DATED | : February 19, 2008 |
| INVENTOR(S) | : William E. Fristad et al. |

Page 1 of 1

It is certified that error appears in the above-identified patent and that said Letters Patent is hereby corrected as shown below:

In Claim 10, in column 15, on line 31, "acid-stable particles maintain a change in viscosity often" should read -- acid-stable particles maintain a change in viscosity of ten --.

In Claim 14, in column 15, on line 40, "The coating composition of claim 3. wherein the" should read -- The coating composition of claim 1 wherein the --.

Signed and Sealed this

Seventeenth Day of June, 2008

JON W. DUDAS
*Director of the United States Patent and Trademark Office*